United States Patent
Li (10) Patent No.: US 8,917,417 B2
(45) Date of Patent: Dec. 23, 2014

(54) IMAGE FORMING APPARATUS, IMAGE FORMING METHOD AND COMPUTER-READABLE MEDIUM STORING IMAGE FORMING PROGRAM

(71) Applicant: Quanhe Li, Aichi (JP)

(72) Inventor: Quanhe Li, Aichi (JP)

(73) Assignee: Brother Koygo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/038,971

(22) Filed: Sep. 27, 2013

(65) Prior Publication Data

US 2014/0185062 A1   Jul. 3, 2014

(30) Foreign Application Priority Data

Dec. 27, 2012 (JP) ................................. 2012-284095

(51) Int. Cl.
*G06K 15/02* (2006.01)

(52) U.S. Cl.
CPC .................................. *G06K 15/1843* (2013.01)
USPC ........... 358/1.2; 358/1.13; 358/1.9; 358/1.15; 358/1.18

(58) Field of Classification Search
USPC ............. 358/1.11, 1.13, 1.15, 1.17, 1.18, 1.2, 358/1.6, 1.9, 3.3, 448, 450; 715/803
See application file for complete search history.

(56) References Cited

U.S. PATENT DOCUMENTS

| | | | |
|---|---|---|---|
| 5,548,406 A | 8/1996 | Aihara | |
| 6,870,633 B1 * | 3/2005 | Kadota | 358/1.13 |
| 8,218,193 B2 * | 7/2012 | Kim | 358/1.2 |
| 2005/0068583 A1 * | 3/2005 | Gutkowski et al. | 358/1.18 |
| 2009/0316163 A1 * | 12/2009 | Hanawa | 358/1.6 |

FOREIGN PATENT DOCUMENTS

| | | |
|---|---|---|
| JP | H03-262262 A | 11/1991 |
| JP | 2003-046763 A | 2/2003 |
| JP | 2005-018356 A | 1/2005 |

* cited by examiner

*Primary Examiner* — Allen H Nguyen
(74) *Attorney, Agent, or Firm* — Scully, Scott, Murphy & Presser, PC (57) ABSTRACT

A controller of an image forming apparatus is configured to judge whether a first sheet size of the first image data is larger than a size of an in-use sheet. When the first sheet size is larger than the in-use sheet size, it is judged whether the resizing operation is to be applied to the first image data, resize the image size of the first image data to meet the in-use sheet size by applying the resizing operation to the first image data when the resizing operation is to be applied to the first image data, and control the image forming device to form an image on the sheet based on the first image data to which the resizing operation has been applied.

11 Claims, 6 Drawing Sheets

IMAGE FORMING APPARATUS, IMAGE FORMING METHOD AND COMPUTER-READABLE MEDIUM STORING IMAGE FORMING PROGRAM

CROSS-REFERENCE TO RELATED APPLICATION

This application claims priority under 35 U.S.C. §119 from Japanese Patent Application No. 2012-284095 filed on Dec. 27, 2012. The entire subject matter of the application is incorporated herein by reference.

BACKGROUND

1. Technical Field

Aspects of the invention relate to an image forming apparatus, an image forming method and a computer-readable medium storing an image forming program.

2. Conventional Art

Conventionally, there has been known an image forming apparatus configured to perform a marginless printing to print an image on a print sheet without forming a margin thereon, based on a print command transmitted from an external device. For the marginless printing, the external device generates image data by trimming upper/lower portions or right/left portions of an original image represented by original image data and by resizing the thus trimmed image, and transmits the generated image data to the image forming apparatus.

SUMMARY

Recently, there has been known an image forming apparatus having a sheet feed tray configured to accommodate a plurality of sizes of print sheets. When the resized image data is transmitted from the external device to such an image forming apparatus, a problem as follows might occur. That is, although the image data is resized so that a marginless printing is performed on the print sheet having a certain size, the sheet actually held in the sheet tray may be different from the size of the print sheet subjected to the marginless printing. In such a case, in order to perform the marginless printing, the resized image data transmitted from the external device should be resized again to meet the actual size of the print sheet (i.e., so that the marginless printing can be performed on the sheet actually held in the printing device).

It is noted that the resizing of the image is done by trimming the upper/lower portions or right/left portions of the original image based on an aspect ratio of a print sheet and reducing/magnifying the trimmed image to meet the size of the print sheet so that no margin is formed thereon.

When an image which has been once resized by the external device is resized again in the printing device, and in particular, the resizing includes trimming of the image, an original data should be trimmed twice. In such a case, an area trimmed, by two resizing operation, from the original image might be excessively large, and the resultant resized image might not be one a user intended.

Figure 6A:
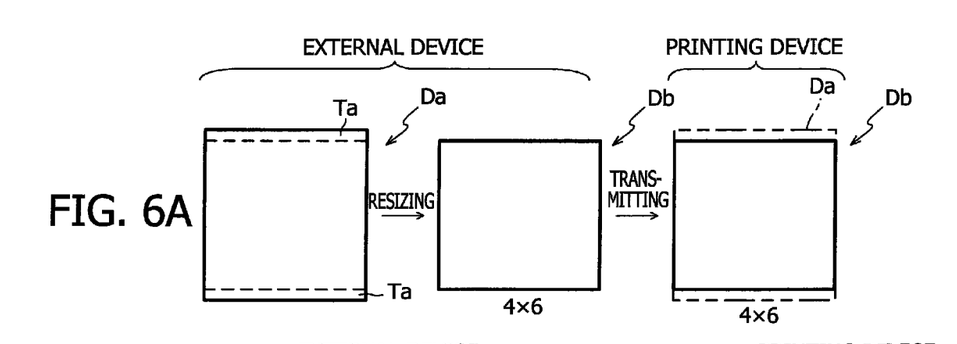
FIGS. 6A and 6B are charts illustrating a problem in conventional art.

FIGS. 6A and 6B illustrate examples of such a problem. As shown in FIG. 6A, when a preset sheet size in the external device is a 4×6 size, the external device trims upper/lower portions Ta of an original image represented by the original image data Da to meet an aspect ratio of the 4×6 size sheet, generates resized image data Db representing a resized image which is a reduced/magnified image of the trimmed image, and transmits the resized image data Db to the image forming apparatus. If the sheet actually accommodated in the sheet feed tray of the image forming apparatus is the 4×6 sheet, the image forming apparatus forms an image on the 4×6 sheet based on the received image data Db.

Figure 6B:
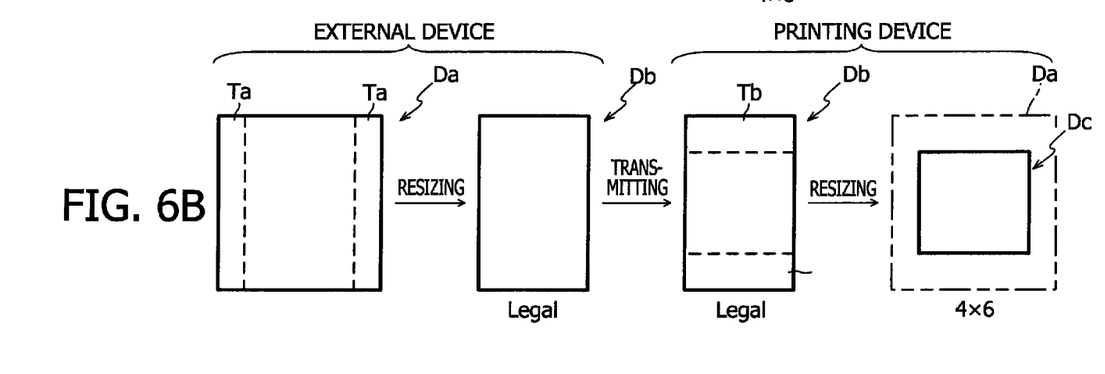

As shown in FIG. 6B, when a preset size of a print sheet set in the external device is a legal size, the external device resizes the original image by trimming the right/left portions Ta of the original image (and reduces/magnifies the trimmed image, if necessary) so that the resized image meets the legal size sheet and generates the image data Db representing the resized image. The image data Db thus generated is transmitted to the image forming apparatus. If a print sheet held in the sheet feed tray is a 4×6 sheet, the image forming apparatus trims the upper/lower areas Tb of the resized image represented by the received image data Db to meet the 4×6 size sheet. That is, in the case shown in FIG. 6B, image data Dc representing twice-resized image data is generated, and the image forming apparatus prints an image based on the image data Dc.

Aspects of the invention provide improved image forming apparatus and method which enabling output of an appropriate image when the image represented by the image data resized in the external device is larger than the size of the actually in-use print sheet.

According to aspects of the invention, there is provided an image forming apparatus, which has a tray configured to accommodate a sheet, an image forming device configured to form an image on the sheet, a data communication device and a controller. The controller is configured to judge, when the data communication device receives first image data from an external device, whether a first sheet size corresponding to the first image data is larger than a size of the sheet accommodated in the tray, make first judgment, when the controller judges that the first sheet size is larger than the size of the sheet accommodated in the tray, whether the first image data has been generated by applying a resizing operation to original image data based on resize information which the data communication device receives from the external device, the resizing operation being an operation of trimming portions of an image to adjust an image size of the image data, make second judgment, when the first judgment judges that the first image data has been obtained by applying the resizing operation to the original image data, whether the resizing operation is to be applied to the first image data in order to make an image size of the first image data meet an in-use sheet size based on a portion of an image represented by the first image data which protrudes with respect to the in-use sheet size, resize the image size of the first image data to meet the in-use sheet size by applying the resizing operation to the first image data when the second judgment judges that the resizing operation is to be applied to the first image data, and control the image forming device to form an image on the sheet based on the first image data to which the resizing operation has been applied.

It is noted that aspects of the invention can be configured in various configurations, which include a controller that controls an image forming apparatus, an image forming system, an image forming method, an image forming program, a recording medium storing the image forming program, and the like.

DETAILED DESCRIPTION OF THE EMBODIMENT

Hereinafter, a preferred embodiment will be described in detail with reference to the accompanying drawings.

Figure 1:
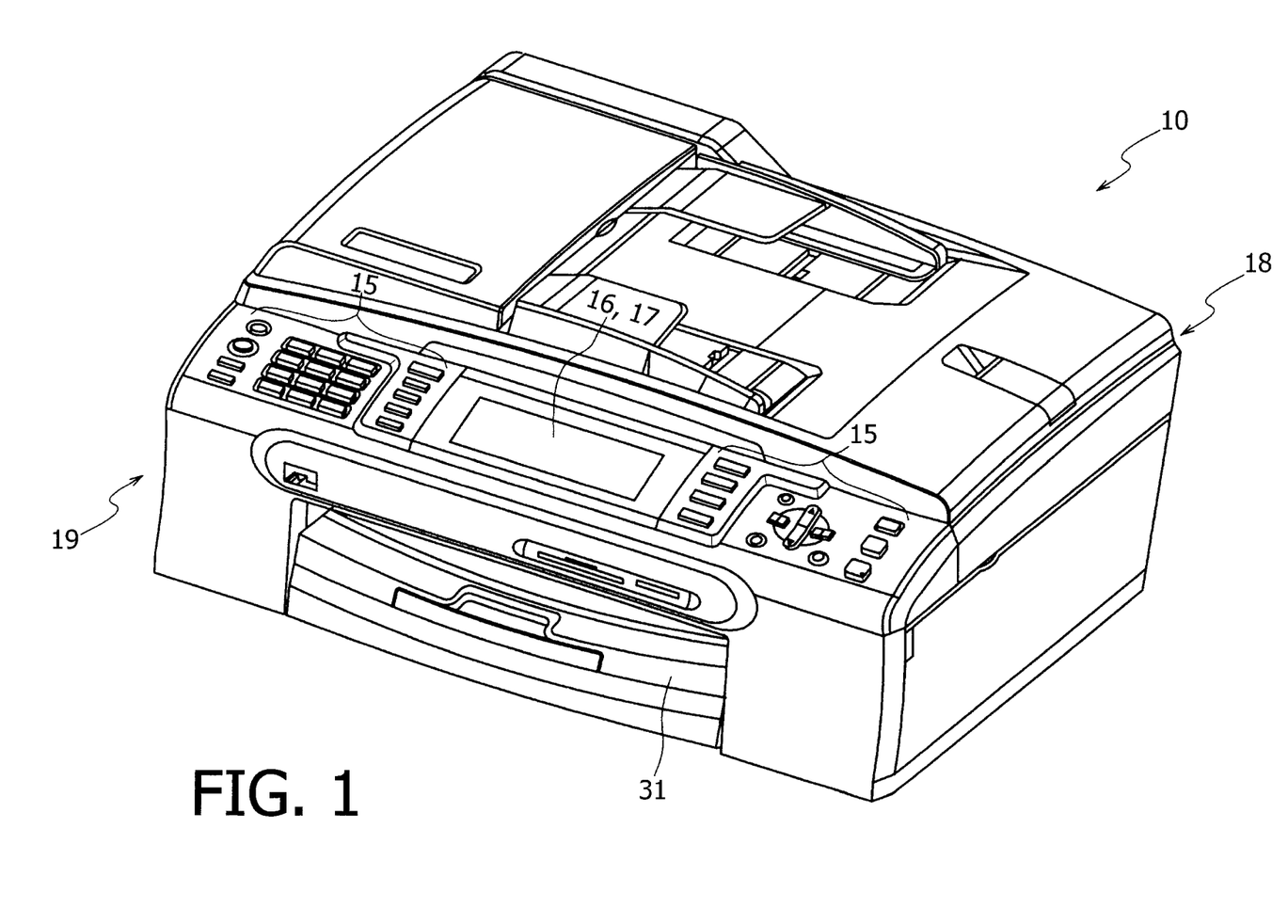
FIG. 1 is a perspective view of an MFP (multi-function peripheral) according to an embodiment of the present invention.
Figure 2:
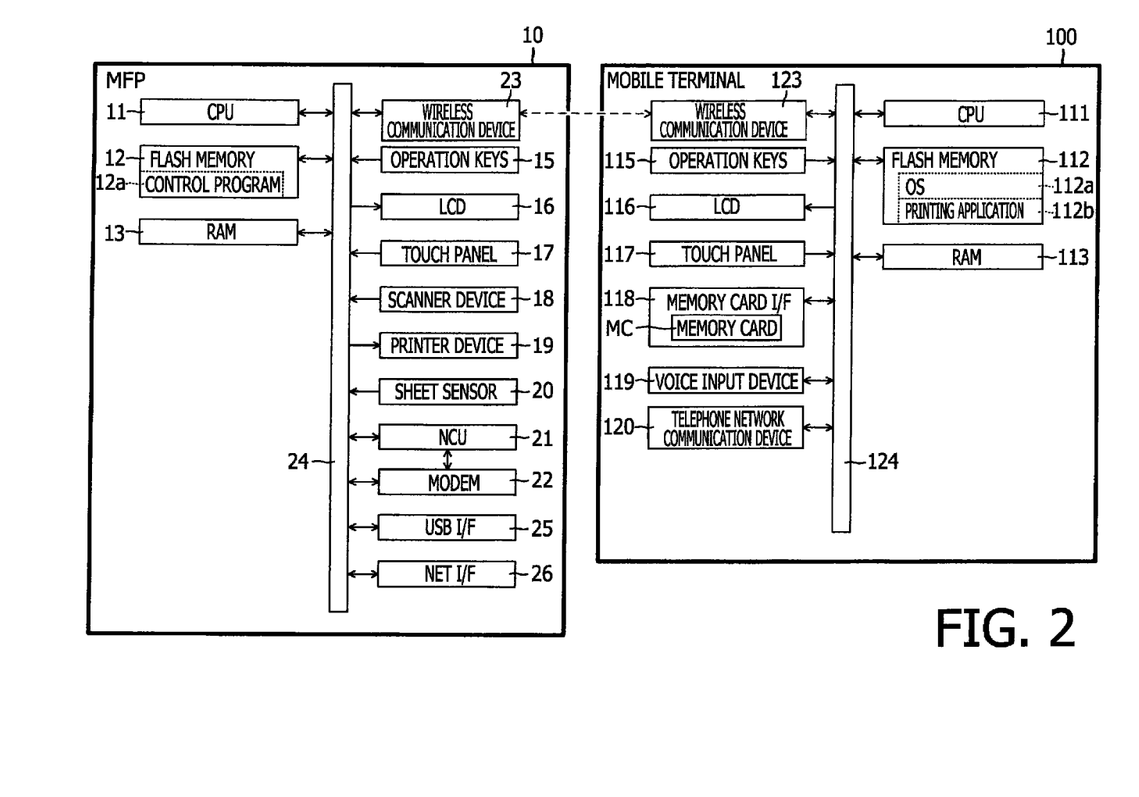
FIG. 2 is a block diagram showing an electrical configuration of the MFP and a mobile terminal according to the embodiment of the invention.

An MFP (multi-function peripheral) 10 according to the embodiment of the invention has a printer function, a facsimile function, a scanner function and a copier function. In particular, according to the embodiment, the MFP 10 has a function of receiving an image from a mobile terminal 100 through a wireless communication, and printing the received image on a print sheet. Further, according to the embodiment, the MFP 10 is configured such that, even when a size of the print sheet set at the mobile terminal (i.e., the size of the sheet in association with the image data generated in the mobile terminal 100) is different from the size of the print sheet actually accommodated in a sheet feed tray 31 of the MFP 31, an appropriate printing result can be output.

The MFP 10 has a printer unit 19 provided at a lower part and a scanner unit 18 provided at an upper part. On an upper front surface of the MFP 10, operation keys 15 and an LCD (liquid crystal display) 16 are provided. A touch panel 17 is overlaid on the LCD 16. The printer unit 19 includes a sheet feed tray 31 and a sheet discharge tray 32 configured in a two-tiered arrangement. A part of the sheet feed tray 31 and a part of the sheet discharge tray 32 are exposed to outside through an opening formed on a front surface of the MFP 10.

The print sheets accommodated in the sheet feed tray 31 are fed into the printer unit 19 one by one. After an image is printed on the print sheet based on image data, the print sheet is discharged on the discharge tray 32.

The scanner unit 18 is configured as a well-known flatbed scanner. The original is placed on a platen glass arranged below an original cover that is provided to serve as a top plate of the MFP 10. The scanner unit 18 scans the original which is covered with the original cover (i.e., the top plate of the MFP 10), and generates image data representing the scanned image.

As shown in FIG. 2 the MFP 10 and the mobile terminal 100 are communicatable with each other. The MFP 10 has a CPU (central processing unit) 11, a flash memory 12, a RAM (random access memory) 13, the operation keys 15, the LCD 16, the touch panel 17, the scanner unit 18, the printer unit 19, a sheet sensor 20, an NCU (network communication unit) 21, a MODEM (modulator/demodulator) 22, a communication unit 23, a USB (universal serial bus) interface 25, and a network interface 26. The above units and components are connected with each other though an input/output port 24.

Figure 3:
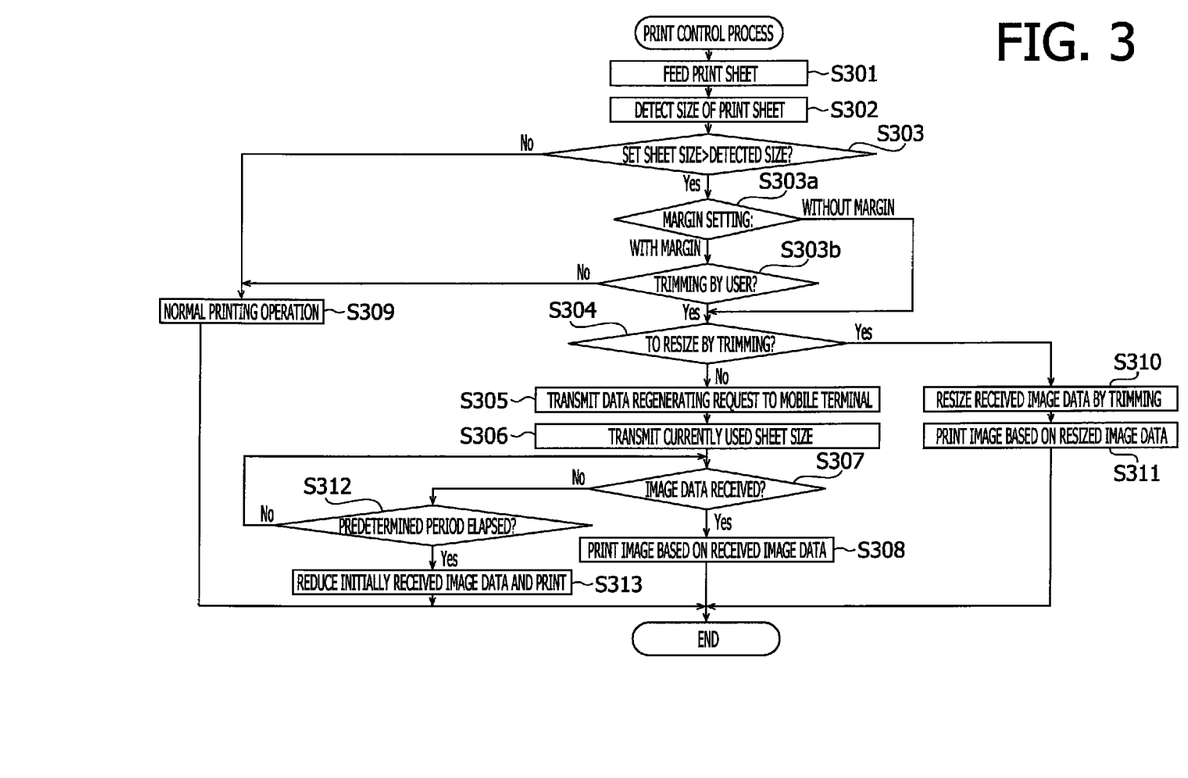
FIG. 3 shows a flowchart illustrating a print control process executed in the MFP according to the embodiment of the present invention.
Figure 4:
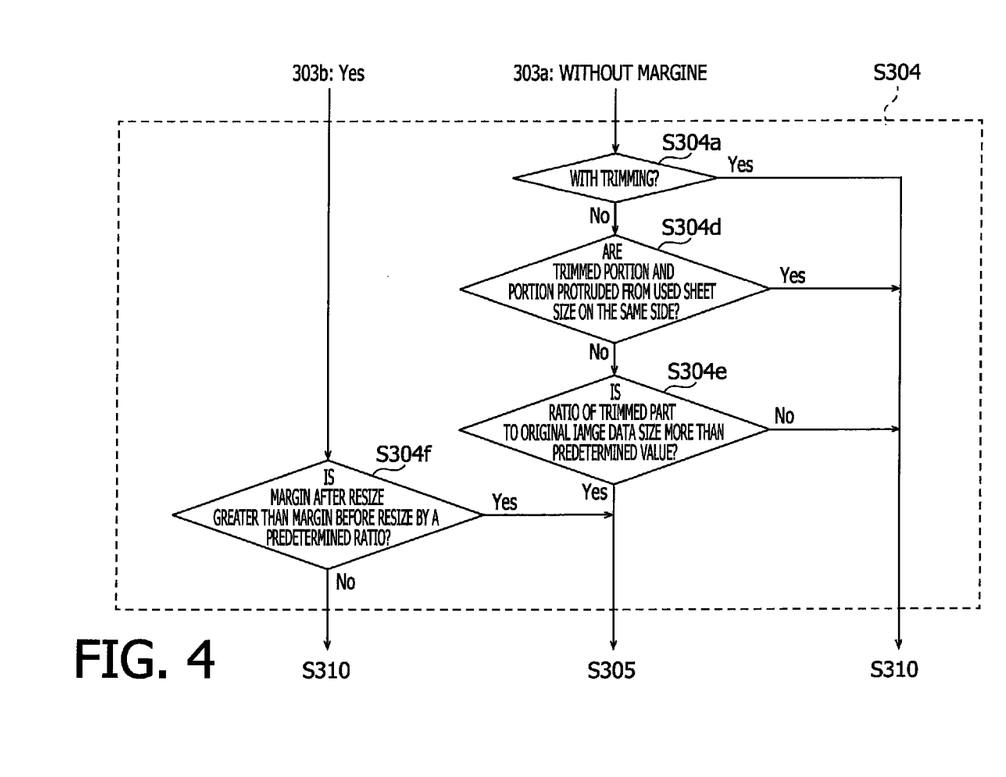
FIG. 4 is a flowchart showing a detailed process of a judging step S304 of FIG. 3.

The CPU 11 controls respective functions of the MFP 10 and/or respective units/components connected to the input/output port 24 based on fixed values/parameters and programs stored in the flash memory 12, data stored in the RAM 13 and/or signals transmitted/received via the NCU 21. It is noted that the flash memory 12 is a non-volatile memory that stores control programs 12a and the like. Processes shown in FIGS. 3 and 4 are examples of the processes the CPU 11 executes based on the control programs 12a. The RAM 13 is a volatile memory which temporarily stores various kinds of data when the CPU 11 executes the control programs 12a.

The operation keys 15 are mechanical keys through which a user can input various setting values and commands. The LCD 16 is used for displaying various screens. The touch panel 17 is overlaid on the LCD 16. When a pointing object such as a finger or a stick-like object (e.g., a stylus pen) touches or located close to a screen displayed on the LCD 16, the touch panel 17 detects a position to which the finger or stick-like object touches/approaches and inputs the detected position to the CPU 11. The scanner unit 18 scans an original and generates image data corresponding to the scanned image of the original. The printer unit 19 prints an image based on the image data on a print sheet. The sheet sensor 20 is for detecting a size of the sheets accommodated in the sheet feed tray 31. According to the embodiment, the sheet sensor 20 is arranged on a bottom surface (i.e., a surface facing the print sheets) of the print head provided to the printer unit 19, and is configured to optically detect a size of the sheet, which is fed from the sheet feed tray 31, in a width direction which is perpendicular to a sheet feed direction.

The MODEM 22 generates a signal which is modulated based on the image data and transmittable through the well-known telephone network when a facsimile transmission is performed. The MODEM 22 is also configured to demodulate the signal, received through the telephone network, by the NCU 21 to reproduce image data. The NCU 21 is configured to connect the MFP 10 to the telephone network, with controlling connection/disconnection with respect to the telephone network by switching ON/OFF a circuit in accordance with instructions from the MODEM 22.

The communication unit 23 is an interface used when a wireless communication is performed. According to the embodiment, the wireless communication unit 23 is configured to execute the Wi-Fi (registered trademark) communication based on the IEEE 802.11b/g standard.

The MFP 10, which has the wireless communication unit 23, can be connected to the mobile terminal 100, which has a wireless communication unit 123, in an infrastructure mode via a well-known access point which serves as a relaying device, or in an ad-hoc mode. The USB I/F 25 is a well-known interface and is used when a storage device (e.g., a USB memory) or other devices (e.g., a personal computer or a hard disk drive) are communicatably connected to the MFP 10 through a USB plug. The network I/F 26 is an interface which is used when the MFP 10 is connected to a network such as the Internet or LAN (local area network).

The mobile terminal 100 is typically known as a smartphone or a cell phone. The mobile terminal 100 has a CPU 111, a flash memory 112, a RAM 113, operation keys 115, an LCD 116, a touch panel 117, a memory card I/F (interface) 118, a voice input unit 119, a telephone network communication unit 120 and a wireless communication unit 123. The above units/components are interconnected through an input/output port 124. The CPU 111 is configured to control such units/components connected to the input/output port 124 in accordance with fixed values, programs and the like stored in the ROM 112 or the like.

Figure 5:
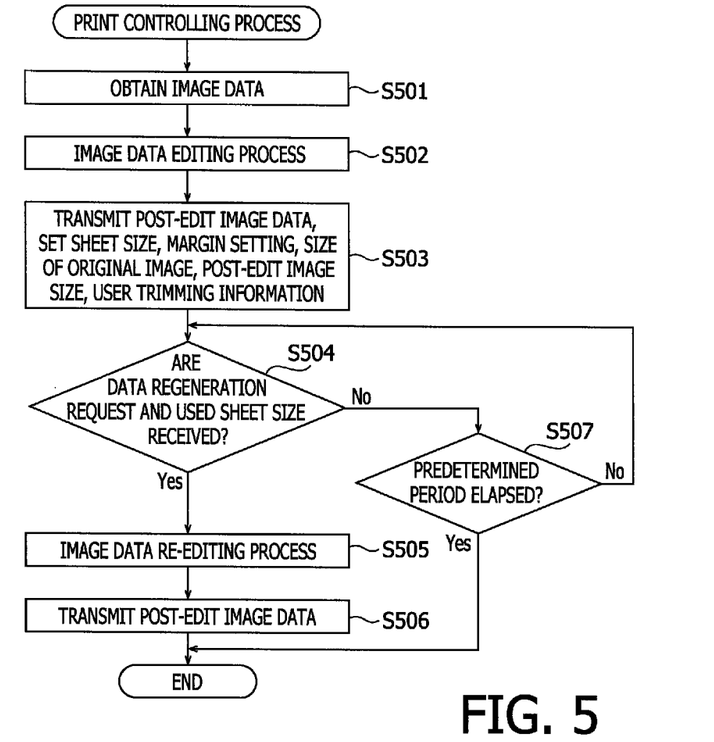
FIG. 5 is a flowchart illustrating a print control process executed in a terminal device according to the embodiment of the invention.

The flash memory 112 is a rewritable non-volatile memory, and stores an OS (operating system) 112a and a printing application 112b. The OS 112a is basic software realizing a standard function of the mobile terminal 100. According to the embodiment, iOS (registered trademark) is employed as the OS. The printing application 112b is an application supplied by a vendor of the MFP 100. The printing application 112b is installed in the mobile terminal 100 by the user, and enables the MFP 10 to print images based on the image data directly transmitted from the mobile terminal 100, without using the personal computer or the like. As will be described later, a process illustrated by a flowchart shown in FIG. 5 is executed by the CPU 111 in accordance with the printing application 112b. The RAM 113 is a rewritable volatile memory having a temporary area which temporarily storing various kinds of data when the CPU 11 executes various programs such as the printing application 112b.

The operation keys 115 are mechanical keys through which the user can input various setting values and commands. The LCD 116 is used for displaying various screens. The touch panel 117 is overlaid on the LCD 116. The touch panel 17 detects a position to which the finger or stick-like object touches/approaches and inputs the detected position to the CPU 111. A memory card I/F 118 is an interface configured such that a non-volatile memory card MC is to be connected, and interfaces writing/reading of data to/from the memory card MC. The voice input unit 119 is a voice input/output device having a microphone and speaker. The telephone network communication unit 120 is a circuit enabling voice communication through a mobile phone network. A wireless communication unit 23 is, like the wireless communication unit 23 of the MFP 10, an interface for the wireless communication.

FIG. 3 is a flowchart illustrating a print control process executed by the CPU 11 of the MFP 10 in accordance with the control program 12a. The print control process is started when the CPU 11 detects that the wireless communication unit 23 receives image data subject to printing from the mobile terminal 100.

The mobile terminal 100 transmits, together with the image data subject to printing, the size of the print sheet which is preset at the mobile terminal 100, a setting of margins on the print sheet set at the mobile terminal 100, the size of the original image represented by original image data corresponding to the image data subject to printing, the size of the image represented by the image data subject to printing and user trimming information indicating whether trimming designated by the user has been made in the mobile terminal 100, to the MFP 10.

Thus, when the MFP 10 receives the image data subject to printing from the mobile terminal 100, the MFP 10 also receives the above items (information). It should be noted that the "original image data" represents the image data corresponding to the image the user selects as an image to be printed at the mobile terminal 100. Further, the "set sheet size" is information identifying standard size of the print sheet referred to in the mobile terminal 100. The "margin setting" is information indicating whether printing is to be done with the margin or without the margin (i.e., whether margin printing is performed or marginless printing is performed). The "image data size" is represented by a set of coordinates (x, y) with respect an origin, given that the image data has a rectangular area (shape), the sides of the rectangular shape extend in X or Y axis direction, the origin coincides with an apex of the rectangular shape and the set of coordinates (i.e., the image data size") is of another apex diagonal to the origin.

In the following description, in order to distinguish the "size represented by the original image data" and the "size represented by the image data subject to printing", the former is represented by coordinates (x0, y0) and the latter is represented by coordinates (x1, y1). In the following description, the sets of coordinates (x0, y0) and (x1, y1) will also be referred to simply as a "size of the original image data" and a "size of the image data subjected to printing", respectively. Further, in the following description, the "image size of image data" means the size of an image represented by the image data. Therefore, in the description, "the image size of the original image data" means the size of an original image represented by the original image data, and "the image size of the received image data" means the size of an image represented by the received image data.

When the print control process is started, the CPU 11 feeds one of the print sheets held in the sheet feed tray 31 to a position where the sheet is detected by the sheet sensor 20 provided at the lower surface of the print head provided to the printer unit 19 (S301). Next, the CPU 11 detects the size of the print sheet with use of the sheet sensor 20 (S302). Specifically, in S302, the CPU 11 moves the print head of the printer unit 19 in the width direction (hereinafter, which direction will also be referred to as a main scanning direction) to detect the width of the print sheet which has been fed in S301 using the sheet sensor 21. Then, based on the width detected by the sheet sensor 21, the CPU 11 detects the size of the sheet (e.g., A4 size, Legal size, etc.).

Next, the CPU 11 judges whether the size represented by the image data received from the mobile terminal 100 is larger than the size of the current print sheet (S303). If the CPU 11 judges that the size represented by the image data received from the mobile terminal 100 is not larger than the current print sheet (S303: NO), the CPU 11 controls the printer unit 19 to execute a normal printing operation (S309), and finishes the print control process. That is, the CPU 11 causes the printer unit 19 to print an image based on the received image data. As a result of execution of S309, an image is formed based on the received image data on the print sheet fed from the sheet feed tray 31.

When the CPU 11 judges that the sheet size represented by the received image data is larger than the in-use sheet size (S303: YES), the CPU 11 checks the margin setting of the image data received from the mobile terminal 100 to judge whether the margin printing or marginless printing is to be executed (S303a). When the CPU 11 judges that the received margin setting indicates the marginless printing (S303a: without margin), the CPU 11 judges whether received image data is to be resized by trimming (S304). How the judgment in S304 is made will be described later referring to FIG. 4.

When the CPU 11 judges that the received margin setting indicates the margin printing (S303a: with margin), the CPU 11 judges whether trimming based on a user instruction has been made (S303b). The judgment in S303b is made based on the user trimming information received from the mobile terminal 100. Specifically, when the user trimming information indicates the trimming based on the user instruction has been made, the CPU 11 judges that the trimming based on the user instruction has been made in the mobile terminal 100.

When the user trimming information indicates that the trimming based on the user instruction has not been made, the CPU 11 judges that the trimming based on the user instruction has not been made. When the CPU 11 judges that the trimming based on the user instruction has been made (S303b: YES), the CPU 11 moves the process to S304. When the CPU 11 judges that the trimming based on the user instruction has not been made (S303b: NO), the CPU 11 causes the printer unit 19 to execute the normal printing operation (S309), and finishes the process.

When the CPU 11 judges that resizing of the received image data is to be done (S304: YES), the CPU 11 resizes the received image data by trimming to meet the in-use sheet size (S310). Next, the CPU 11 causes the printer unit 19 to print an image based on the resized image data (S311), and finishes the print control process.

In the specification, to make "the size represented by the image data meet the in-use sheet" does not apply only when the size represented by the image data after resizing coincides with the in-use sheet size. For example, when the margin setting received from the mobile terminal 100 represents the "without margin", the CPU 11 resizes the image data so that the size represented by the image data is slightly larger than the in-use sheet size. Then, as a result of S310 and S311, an image based on the image data which is generated by resizing (i.e., trimming) the received image data is printed on the print sheet fed from the sheet feed tray 31.

When the CPU 11 judges that the received image data will not be resized by trimming in the MFP 10 (S304: NO), the CPU 11 causes the wireless communication unit 23 to transmit a data regenerating request to the mobile terminal 100 (S305). Next, the CPU 11 causes the wireless transmission unit 23 to transmit the in-use sheet size to the wireless terminal 100 (S306). As will be described later, when the mobile terminal 100 receives the data regenerating request and in-use sheet size, the mobile terminal 100 executes re-editing of the original image data with changing the sheet size setting to the in-use sheet size. With this configuration, the MFP 10 receives the image data corresponding to the in-use sheet size as image data subject to printing from the mobile terminal 100.

After execution of S305 and S306, the CPU 11 judges whether the wireless communication unit 23 has received the image data subject to printing from the mobile terminal 100 (S307). When the CPU 11 judges that the image data subject to printing has been received (S307: YES), the CPU 11 causes the printer unit 19 to print an image based on the received image data (S308), and finishes the print control process. The image data the MFP 10 receives after execution of S305 and S306 is image data representing original image data after a resizing process has been applied based on the in-use sheet size. Therefore, the received image data is suitable to the size of the sheet held in the sheet feed tray 31. Thus, when the in-use sheet size is transmitted to the mobile terminal 100 (S306), and causes the mobile terminal 100 to re-edit the original image data so that the sheet size coincides with the in-use sheet size, an image having a size which is suitable to the print sheet held in the sheet feed tray 31 is printed on the print sheet fed from the sheet feed tray 31.

When the CPU 11 judges that the image data subject to printing has not been received (S307: NO), the CPU 11 awaits receipt of the image data subject to printing until a predetermined period (e.g., 30 seconds) has elapsed (S312: NO). When the predetermined period has elapsed without receiving the image data (S312: YES), the CPU 11 modifies the firstly received image data to reduce the size of the image represented by the image data, that is, the image data received at a transmission that invokes the current process is modified so that the image size is reduced into the size less than the in-use sheet size, causes the printer unit 19 to print an image based on the thus reduced image data (S313), and finishes the current process. As a result of execution of S313, the image based on the image data which has been firstly received and the image size is reduced to the size less than the in-use sheet size is printed on the print sheet fed from the sheet feed tray 31. That is, in S313, the margin printing is executed. Since it is avoided a case where an image is not printed, and since the entire image is printed on the print sheet as the image represented by the image data is reduced, it is avoided that printing is made with a user-intended portion being omitted from the image.

FIG. 4 shows detailed steps of S303 in the print control process shown in FIG. 3. As described above, when the CPU 11 judges that the received margin setting indicates the marginless printing (S303a: without margin), or when the CPU 11 judges that the received margin setting indicates the margin printing and the user-designated trimming has been applied (S303b: YES), the CPU 11 executes S304 (see FIG. 3). The step S304 of FIG. 3 includes, in detail, S304a, S304d-S304f as shown in FIG. 4.

When the CPU 11 judges that the received margin setting indicates the marginless printing (S303a: without margin), the CPU 11 executes S304a. When CPU 11 judges that the received margin setting indicates the margin printing and the user-designated trimming has been applied (S303b: YES), the CPU 11 executes S304f.

In S304a, the CPU 11 judges whether the received image data is data generated by trimming portions of the original image represented by the original image data. This judgment is made based on the image size of the original image data which is represented by coordinates (x0, y0) received from the mobile terminal 100 and the image size of the image data subject to printing, which is represented by the coordinates (x1, y1). Specifically, when the image size of the image data subject to printing represented by (x1, y1) is smaller than the image size of the original image data represented by (x0, y0), the CPU 11 judges that the received image data (i.e., the image data subject to printing) has been generated by trimming the original image data. Otherwise, the CPU 11 judges that the received image data is generated from the original image data without trimming.

When the CPU 11 judges that the received image data is generated from the original image data without trimming (S304a: NO), the CPU 11 executes S310. Therefore, in such a case, the received image data is modified such that the image size is resized by trimming to meet the in-use sheet size. In this case, trimming is performed only once, an image based on the received image data can be printed on the sheet held in the sheet feed tray 31 without being excessively trimmed.

When the CPU 11 judges that the received image data has been generated from the original image data with trimming (S304a: YES), the CPU 11 judges whether the portion trimmed in the mobile terminal 100 and a portion of the image protruding from the in-use sheet are on the same side (S304d). It is noted that the judgment in S304d is made based on the image size of the original image data represented by the coordinates (x0, y0), the image size of the image data subject to printing represented by the coordinates (x1, y1), and the in-use sheet size.

Specifically, the CPU 11 recognizes which side portion is the portion trimmed from the original image data based on the image size (x0, y0) of the original data received from the mobile terminal 100 and the image size (x1, y1) of the image data subject to printing. Further, the CPU 11 recognizes which portion of the received image data will protrude with respect to the in-use sheet based on the image size (x1, y1) of the image data subject to printing and the size of the in-use sheet (e.g., A4 size, Legal size, etc.).

Then, based on the recognized results, the CPU 11 judges whether the trimmed portion of the original image and the portion of the image represented by the received image data protruding with respect to the in-use sheet are on the same side or not. For example, as shown in FIG. 6B, when right and left areas Ta of the original image represented by the original image data Da have been trimmed in an external device (e.g., the mobile terminal 100), and when upper and lower areas Tb of the image data Db protrude with respect to the in-use sheet, the CPU 11 judges that the portions (i.e., trimmed portions and protruding portions) are not on the same side.

When the CPU 11 judges that the portions trimmed in the mobile terminal 100 and the portion of the image represented by the image data protruding from the in-use sheet are on the same side (S304d: YES), the CPU 11 executes S310. In the received image data, when the portion trimmed in the mobile terminal 100 and the portion protruding from the in-use sheet are on the same side, even if the size of the in-use sheet is transmitted to the mobile terminal 100 and the original image data is re-edited in the mobile terminal 100 in accordance with the in-use sheet size, the result would be the same as a case where the received image data is trimmed in the MFP 10. Therefore, in such a case, the CPU 11 does not transmit the size of the in-use sheet to the mobile terminal 100, and execute S310 so that a printing result can be obtained quickly.

When the CPU 11 judges that the portion trimmed in the mobile terminal 100 and the portion of the image represented by the image data protruding from the in-use sheet are on different sides (S304d: NO), the CPU 11 judges whether a ratio (area ratio) of trimmed amount with respect to the original image represented by the original image data if the image represented by the received image data is resized by trimming is equal to or greater than a predetermined ratio (e.g., 30%) (S304e).

The above judgment is made based on the image size (x0, y0) of the original image data received from the mobile terminal 100, the image size (x1, y1) of the image data subject to printing, and the image size of the in-use sheet. Specifically, the CPU 11 calculate, in the received image data, an amount of the portion trimmed from the original image represented by the original image data. Further, the CPU 11 calculates an amount of a portion trimmed from the received image data based on the image size (x1, y1) of the received image data and the image size (e.g., A4 size, Legal size, etc.) of the in-use sheet. Then, the CPU 11 judges whether the amount of the portion trimmed from the original image represented by the original image data is equal to or greater than the predetermined ratio based on the sum of the trimming amounts calculated above and the image size (x0, y0) of the original image data.

When the CPU 11 resizes the image size of the received image data by trimming, if the CPU 11 judges that the amount of portion trimmed from the original image represented by the original image data is less than the predetermined ratio (S304e: NO), the CPU 11 executes S310. When the portion trimmed in the mobile terminal 100 and the portion protruding with respect to the in-use sheet are not on the same side, there is a possibility that a portion the user intends to print might have been trimmed. However, when the image represented by the received image data is resized by trimming, if the amount of the portion trimmed from the original image represented by the original image data with respect to the original image is less than the predetermined ratio, it is assumed that the possibility that the user-desired portion has been trimmed is relatively low. Therefore, in this case, the image represented by the received image data is resized by trimming to have the image size of the image data meet the in-use sheet size. With this configuration, a time which becomes necessary if communication with the mobile terminal 100 is executed can be omitted, and the user can obtain the printed result quickly.

When the CPU 11 modifies the received image data to resize the image by trimming, if the CPU 11 judges that the amount of portion trimmed from the original image data is equal to or greater than the predetermined ratio (S304e: YES), the CPU 11 executes S305. In this case, the original image data is re-edited in the mobile terminal 100 based on the in-use sheet size, the amount of the portions trimmed from the original image represented by the original image data can be minimized. In this case, it is avoided that the trimming is executed both in the mobile terminal 100 and the MFP 10 and undesired image is printed based on the image data in which trimming has been applied excessively.

In S304f, the CPU 11 judges whether a ratio of an amount of the margin after resizing by trimming of the image represented by the received image data to an amount of the margin before resizing is equal to or more than a prescribed value (e.g., 20%). This judgment is made based on the image size (x1, y1) of the image data subject to printing and the size of the in-use sheet.

Specifically, the CPU 11 calculates the amount of the margin when the image is printed on the used print sheet based on the size (x1, y1) of the image data subjected to be printing, which is received from the mobile terminal 100, and the size of the in-use sheet. Further, the CPU 11 also calculates the amount of the margin which would be formed if an image is printed on the in-use sheet based on the image data which is generated by resizing the received image data with trimming. Then the CPU 11 calculates the ratio of the latter amount of the margin to the former, and makes the above judgment based on the thus calculated ratio.

When the CPU 11 judges that the ratio (area ratio) of the amount of the margin when the image represented by the received image data is resized by trimming to the amount of the margin before resizing is less than the prescribed value (S304f: NO), the CPU 11 executes S310.

When the image data has been modified to trim the image in the mobile terminal 100 in accordance with the user designation, and the image represented by the image data is trimmed again in the MFP 10 to meet the size of the in-use sheet, the portion the user wishes to be printed might be trimmed. However, if a ratio of the portion of the image represented by the received image data to be trimmed to the original image represented by the original image data is less than the predetermined value, the possibility that the portion the user wishes to be printed is trimmed may be relatively low. Therefore, in such a case, resizing of the image represented by the received image data by trimming to make the image meet the size of the in-use sheet saves time which would become necessary for communicating with the mobile terminal 100, and it becomes possible to obtain the printed result quickly.

When the CPU 11 judges that the ratio of the amount of the margin if the received image data is modified to resize the image represented by the received image data by trimming to the amount of the margin before the image is resized is equal to or more than the predetermined amount (S304f: YES), the CPU 11 executes S305. In such a case, the original image data is re-edited based on the size of the in-use sheet in the mobile terminal 100, the amount of trimming from the original image represented by the original image data can be minimized. In this case, it is avoided that trimming is executed twice in the mobile terminal 100 and the MFP 10, respectively, and that the image is printed based on the excessively trimmed image data.

In the mobile terminal 100, a print control process shown in FIG. 5 is executed. Specifically, the process shown in FIG. 5 is executed by the CPU 111 in accordance with the printing application 112b. The print control process shown in FIG. 5 is invoked when the user selects image data to be printed from among image data stored in the memory card MC or the flash memory 12 and inputs a print command, with a trimming frame being set when necessary. It is noted that inputting of the print command is made after the user made the print sheet size setting, the margin setting indicating the margin printing or the marginless printing is to be executed.

The CPU 111 obtains the image data selected by the user (S501). Then, the CPU 111 executes an image data editing process (S502). In S502, for example, if the marginless printing is set, the CPU 111 applies trimming in accordance with print sheet size setting. If the trimming frame is designated by the user, the CPU 111 trims portions of the image represented by the image data outside the frame, and remains a portion of the image data inside the frame.

Next, the CPU 111 transmits the post-edit image data, which has been edited in S502, the set print sheet size, the margin setting, the size of the original image data, the size of the post-edit image data, and the user-trimming information to the MFP 10 through the wireless communication unit 123.

Next, the CPU 111 judges whether the wireless communication unit 123 receives the data regeneration request and the in-use sheet size (S504). When the CPU 111 judges that the data regeneration request or the in-use sheet size (S504: NO), the CPU 111 pauses for a predetermined period (e.g., 30 seconds) (S507: NO) to receive the data regeneration request and the in-use sheet size. When the predetermined period has elapsed (S507: YES) without received the data regeneration request or the in-use sheet size, the CPU 111 terminates the print control process.

When the CPU 111 judges that the data regeneration request and the in-use sheet size have been received (S504: YES), the CPU 111 executes an image data reediting process (S505). Specifically, when the marginless printing is set, the CPU 111 applies trimming to the selected image data (i.e., the original image data) based on the in-use sheet size. If the trimming frame has already been set by the user, the CPU 111 displays a sheet object representing the in-use sheet size and an image based on the original image data on the LDC 116 in an overlapped manner and urges the user to perform trimming taking the in-use sheet size into consideration. Next, the CPU 111 causes the wireless communication unit 123 to transmit post-edit image data to the MFP 10 (S506) and terminates the print control process.

It should be appreciated that the above-described embodiment is only an exemplary one according to aspects of the invention, and can be modified in various ways without departing from the scope of the invention.

For example, according to the exemplary embodiment, the MFP 10, which has a printer function and further functions as an example of the image forming apparatus. However, a single-function printer can be employed as the image forming apparatus, to which the invention is applicable. Further, according to the exemplary embodiment, the mobile terminal 100 having a telephone function (e.g., the smartphone and the cell phone) is employed as the external device. It is noted that, as the mobile terminal, a tablet terminal, a digital camera or an information processing device such as a personal computer can also be employed as the external device. Furthermore, according to the exemplary embodiment, as the OS 12a implemented in the mobile terminal 100, the iOS (registered trademark) is explained. This is only an exemplary one, and it should be appreciated that another OS such as Android (registered trademark) or Windows (registered trademark) can be employed.

According to the exemplary embodiment, the MFP 10 prints the image data transmitted from the mobile terminal 100 which is implemented with the iOS (registered trademark) with use of a system similar to the AirPrint (registered trademark). The invention should not be limited to the described configuration, and when the image data is transmitted from a mobile terminal implemented with the OS such as Android (registered trademark) or Windows (registered trademark), the invention can be applied in a similar manner. Further, when the image data is transmitted to the MFP 10 via a network, for example, with use of the Google Cloud Printing (registered trademark), or when the image data is transmitted from a personal computer to the MFP 10 through a USB (universal serial bus) or a network, the invention can be applied in a similar manner.

According to the exemplary embodiment, the sheet sensor 20 is arranged on the lower surface of the print head of the printer unit 19, and is configured as a sensor that can detects a width (i.e., a length of the sheet in a direction perpendicular to its feeding direction). Such a configuration is only an exemplary one and the size of the in-use sheet may be detected in various ways. For example, the CPU may detects the in-use sheet size based on a signal representing a distance between a pair of sheet guides which may be provided on the sheet feed tray to guides the sheet in the feeding direction. Alternatively, a user input of the sheet size at the MFP may be used as the in-use sheet size.

According to the exemplary embodiment, the MFP 10 receives the size of the image data subject to printing (i.e., the post-edit image data) from the mobile terminal 100. The invention should not be limited to this configuration and the CPU 11 of the MFP 10 may be configured to obtain the size of the image data subject to printing based on the image data received from the mobile terminal 10.

According to the exemplary embodiment, the CPU 11 is configured to compare the set sheet size received from the mobile terminal 100 with the in-use sheet size detected with the sheet sensor 20. Instead of such a configuration, the CPU 11 may be configured to obtain the set sheet size based on the size of the received image data, and compare the thus obtained sheet size with the in-use sheet size detected with the sheet sensor 20. In such a case, the MFP 10 may be configured not to receive the set sheet size from the mobile terminal 100. Alternatively, the size of the in-use sheet is converted into a size of an image corresponding to the in-use sheet, and the converted size may be compared with the image size of the received image.

According to the exemplary embodiment, after execution of S304d, S304e is executed. Alternatively, the process can be modified such that S304d is executed after execution of S304e. Specifically, in such a modification, when judgment of the CPU 11 at S304e is "YES", the CPU 11 executes S305, while judgment of the CPU 11 at S304e is "NO", the CPU 11 executes S304d. That is, when the received image data is resized by trimming, the amount trimmed from the original image data is equal to or greater than the predetermined ratio with respect to the size of the original image data, the data regenerating request and the in-use sheet size may be transmitted to the mobile terminal 100 regardless a positional relationship between the trimmed portion and the protruding portion of the image with respect to the in-use sheet size. Further, judgment whether re-trimming is to be executed in the MFP 10 may be made only by one of S304d and S304e, and the other step may be omitted.

According to the exemplary embodiment, when the MFP 10 transmits the data reediting request and the in-use sheet size, but does not receive the image data re-edited based on the data reediting request from the mobile terminal 100 within a predetermined period, the firstly received image data is reduced to the size less than the in-use sheet size (S313). This can be modified such that the CPU 11 executes S310 and S311 instead of S313, that is, the CPU 11 may resize the initially received image data by trimming.

According to the exemplary embodiment, the CPU 111 of the mobile terminal 100 executes the image data reediting process (S505) when it receives the data reediting request and the in-use sheet size. The above configuration may be modified such that the CPU 111 executes the image data reediting process (S505) when the in-use sheet size is received. In such a case, it is unnecessary for the MFP 10 to transmit the data reediting request.

According to the exemplary embodiment, when the CPU 11 judges not to resize the received image data by trimming (S304: NO), the CPU 11 transmits the data reediting request and the in-use sheet size to the mobile terminal 100. This may be modified such that the CPU 11 reduces the received image data to a size less than the in-use sheet size, and print an image based on the thus reduced image data. In this case, the contents of the image are reduced, but it is prevented that an image is printed with the user-desired portions being omitted.

According to the exemplary embodiment, the CPU 11 judges whether the portion trimmed from the original image data is equal to or more than the predetermined ratio of the size of the original image data when the received image data is to be resized by trimming (S304e). This can be modified such that the CPU 11 judges whether portions trimmed from the received image data is equal to or more than the predetermined ratio of the size of the received image data.

According to the exemplary embodiment, the MFP 10 is configured to judge whether the original image data has been trimmed in the mobile terminal 100 based on the size of the original image data received from the mobile terminal, and the size of the received image data (i.e., the image data subject to printing). This configuration may be modified such that the mobile terminal 100 transmits information indicating trimming has been applied and information indicating trimmed portions (e.g., up-and-down portions or right-and-left portions) to the MFP 10, and the MFP 10 judges whether the original image data has been trimmed in the mobile terminal 100 based on the above information. Optionally, the mobile terminal 100 may be configured to transmit trimmed amount with respect to the original image data and/or a ratio of the trimmed portion to the original image data to the MFP 10 in addition to the information indicating the trimming is applied and information indicating the trimmed portions.

According to the exemplary embodiment, the CPU 11 is configured to execute the print control process shown in FIGS. 3 and 4. It is noted that the steps of FIGS. 3 and 4 may be cooperatively executed by a plurality of CPU's. Alternatively, an IC (integrated circuit) such as ASIC (application specific integrated circuit) may be configured to execute the steps shown in FIGS. 3 and 4. Of course, the CPU 11 and an IC (e.g., ASIC) may cooperatively execute the steps shown in FIGS. 3 and 4.

It is noted that information the MFP 10 receives, together with the image data subject to printing, from the mobile terminal 100 needs not be limited to those described in the exemplary embodiment. For example, the MFP 10 may receive information based on which the MFP 10 can judge whether the image data received from the mobile terminal 100 has been resized by trimming in the mobile terminal 100 (e.g., information indicating the size of the original image data).

The actual values/size of the set sheet size, the margin setting, the size of the original image data, the size of the image data subject to printing and the timing of receiving the user trimming information should not be limited to those described in the exemplary embodiment. Such information may be received before the MFP 10 receives the image data subject to printing. Alternatively, such information may be received after the MFP 10 receives the image data subject to printing but before the CPU 11 start executing S303.

What is claimed is:

1. An image forming apparatus, comprising:
a tray configured to accommodate a sheet;
an image forming device configured to form an image on the sheet;
a data communication device; and
a controller configured to:
    judge, when the data communication device receives first image data from an external device, whether a first sheet size corresponding to the first image data is larger than a size of the sheet accommodated in the tray;
    make first judgment, when the controller judges that the first sheet size is larger than the size of the sheet accommodated in the tray, whether the first image data has been generated by applying a resizing operation to original image data based on resize information which the data communication device receives from the external device, the resizing operation being an operation of trimming portions of an image to adjust an image size of the image data;
    make second judgment, when the first judgment judges that the first image data has been obtained by applying the resizing operation to the original image data, whether the resizing operation is to be applied to the first image data in order to make an image size of the first image data meet an in-use sheet size based on a portion of an image represented by the first image data which protrudes with respect to the in-use sheet size;
    resize the image size of the first image data to meet the in-use sheet size by applying the resizing operation to the first image data when the second judgment judges that the resizing operation is to be applied to the first image data; and
    control the image forming device to form an image on the sheet based on the first image data to which the resizing operation has been applied.

2. The image forming apparatus according to claim 1, wherein, when the first judgment judges that the first image data is generated by applying the resizing operation to the original image data, and when resizing operation is applied to the first image data so as to make the image size of the first image data meet the in-use sheet size,
the second judgment judges that:
    the resizing operation is to be applied to the first image data if the size of areas trimmed in the resizing operation is less than a predetermined ratio of the original image size of the original image data; and
    the resizing operation is not to be applied to the first image data if the size of the areas trimmed in the resizing operation is equal to or more than a predetermined ratio of the original image size of the original image data.

3. The image forming apparatus according to claim 1, wherein, when the first judgment judges that the first image data is generated by applying the resizing operation to the original image data, and when resizing operation is applied to the first image data so as to make the image size of the first image data meet the in-use sheet size,
the second judgment judges that:
    the resizing operation is to be applied to the first image data if areas to be trimmed in the resizing operation and areas having been trimmed from the original image and indicated by the resize information are on the same side; and the resizing operation is not to be applied to the first image data if areas to be trimmed in the resizing operation and areas having been trimmed from the original image and indicated by the resize information are not on the same side.

4. The image forming apparatus according to claim 1, wherein:

the resizing information indicates an image size of the original image corresponding to the first image data; and the first judgment judges whether the first image data has been generated by applying the resizing operation to the original image data based on comparison of the image size of the original image data indicated by the resize information with the image size of the first image data if the set sheet size is judged to be larger than the size of the in-use sheet.

5. The image forming apparatus according to claim 1, wherein:

the controller is configured to further transmit the size of the in-use sheet to the external device so that the external device that has transmitted the first image data applies the resizing operation to the original image data corresponding to the first image data based on the in-use sheet size when the second judgment judges that the resizing operation is not to be applied to the first image data; and when the size of the in-use sheet is transmitted, and when the data communication device receives the second image data which is generated by applying the resizing operation to the original image data based on the in-use sheet size the controller causes the image forming device to form an image on the sheet based on the second image data.

6. The image forming apparatus according to claim 5, wherein, when the data communication device does not receive the second image data from the external device within a predetermined period after the in-use sheet size was transmitted to the external device, the controller modifies the first image data to reduce the image size of the first image data to a size smaller than the in-use sheet size and causes the image forming device to form the image based on the based on the modified first image data.

7. The image forming apparatus according to claim 1, wherein, when the second judgment judges that the resizing operation is not to be applied to the first image data, the controller modifies the first image data to reduce the image size to a size equal to or smaller than the in-use sheet size and causes the image forming device to form the image on the sheet based on the modified first image data.

8. The image forming apparatus according to claim 1, wherein, when the first judgment judges that the first image data is not generated by applying the resizing operation to the original image data, the controller applies the resizing operation to the first image data to make the image size of the first image data meet the in-use sheet size.

9. The image forming apparatus according to claim 1, wherein:

the controller is further configured to judge whether trimming designated by a user has been applied to the first image data based on trimming information which is received, from the external device, by the data communication device and indicates whether the trimming designated by the user has been applied to the first data when the set sheet size is larger than the in-use sheet size; and when it is judged that first image data is data to which trimming designated by the user has been applied, and when the data communication receives a margin printing setting from the external device, the second judgment judges that the resizing operation is to be applied to the first image data if a ratio of the amount of the margin, which would be formed if the resizing operation would be applied to the first image data so as to make the image size of the first image data meet the in-use sheet size, to a margin when the resizing operation would not be applied is not equal to or more than a predetermined amount; and the second judgment judges that the resizing operation is not to be applied to the first image data if a ratio of the amount of the margin, which would be formed if the resizing operation would be applied to the first image data so as to make the image size of the first image data meet the in-use sheet size, to a margin when the resizing operation would not be applied is more than the predetermined amount.

10. A non-transitory computer-readable recording medium storing instructions to be executed by a controller of an image forming apparatus, the image forming apparatus having a tray configured to accommodate a sheet, an image forming device configured to form an image on the sheet and a data communication device, the instructions, when executed, cause the controller to:

judge, when the data communication device receives first image data from an external device, whether a first sheet size corresponding to the first image data is larger than a size of the sheet accommodated in the tray;

make first judgment, when the controller judges that the first sheet size is larger than the size of the sheet accommodated in the tray, whether the first image data has been generated by applying a resizing operation to original image data based on resize information which the data communication device receives from the external device, the resizing operation being an operation of trimming portions of an image to adjust an image size of the image data;

make second judgment, when the first judgment judges that the first image data has been obtained by applying the resizing operation to the original image data, whether the resizing operation is to be applied to the first image data in order to make an image size of the first image data meet an in-use sheet size based on a portion of an image represented by the first image data which protrudes with respect to the in-use sheet size;

resize the image size of the first image data to meet the in-use sheet size by applying the resizing operation to the first image data when the second judgment judges that the resizing operation is to be applied to the first image data; and control the image forming device to form an image on the sheet based on the first image data to which the resizing operation has been applied.

11. An image forming method of an image forming apparatus having a tray configured to accommodate a sheet, an image forming device configured to form an image on the sheet and a data communication device, the method includes steps to:

judge, when the data communication device receives first image data from an external device, whether a first sheet size corresponding to the first image data is larger than a size of the sheet accommodated in the tray;

make first judgment, when the controller judges that the first sheet size is larger than the size of the sheet accommodated in the tray, whether the first image data has been generated by applying a resizing operation to original image data based on resize information which the data communication device receives from the external device, the resizing operation being an operation of trimming portions of an image to adjust an image size of the image data;

make second judgment, when the first judgment judges that the first image data has been obtained by applying the resizing operation to the original image data, whether the resizing operation is to be applied to the first image data in order to make an image size of the first image data meet an in-use sheet size based on a portion of an image represented by the first image data which protrudes with respect to the in-use sheet size;

resize the image size of the first image data to meet the in-use sheet size by applying the resizing operation to the first image data when the second judgment judges that the resizing operation is to be applied to the first image data; and control the image forming device to form an image on the sheet based on the first image data to which the resizing operation has been applied.

* * * * *

UNITED STATES PATENT AND TRADEMARK OFFICE
CERTIFICATE OF CORRECTION

PATENT NO. : 8,917,417 B2  
APPLICATION NO. : 14/038971  
DATED : December 23, 2014  
INVENTOR(S) : Quanhe Li Page 1 of 1

It is certified that error appears in the above-identified patent and that said Letters Patent is hereby corrected as shown below:

Title page, item (73)Assignee, should read:

--(73) Assignee: BROTHER KOGYO KABUSHIKI KAISHA
Nagoya, Aichi (JP)--.

Signed and Sealed this
Eighth Day of December, 2015

Michelle K. Lee
*Director of the United States Patent and Trademark Office*